Dec. 18, 1951 J. L. POTTER 2,578,836
TELEVISION AND RADIO DISTRIBUTION SYSTEM
Filed Dec. 3, 1947
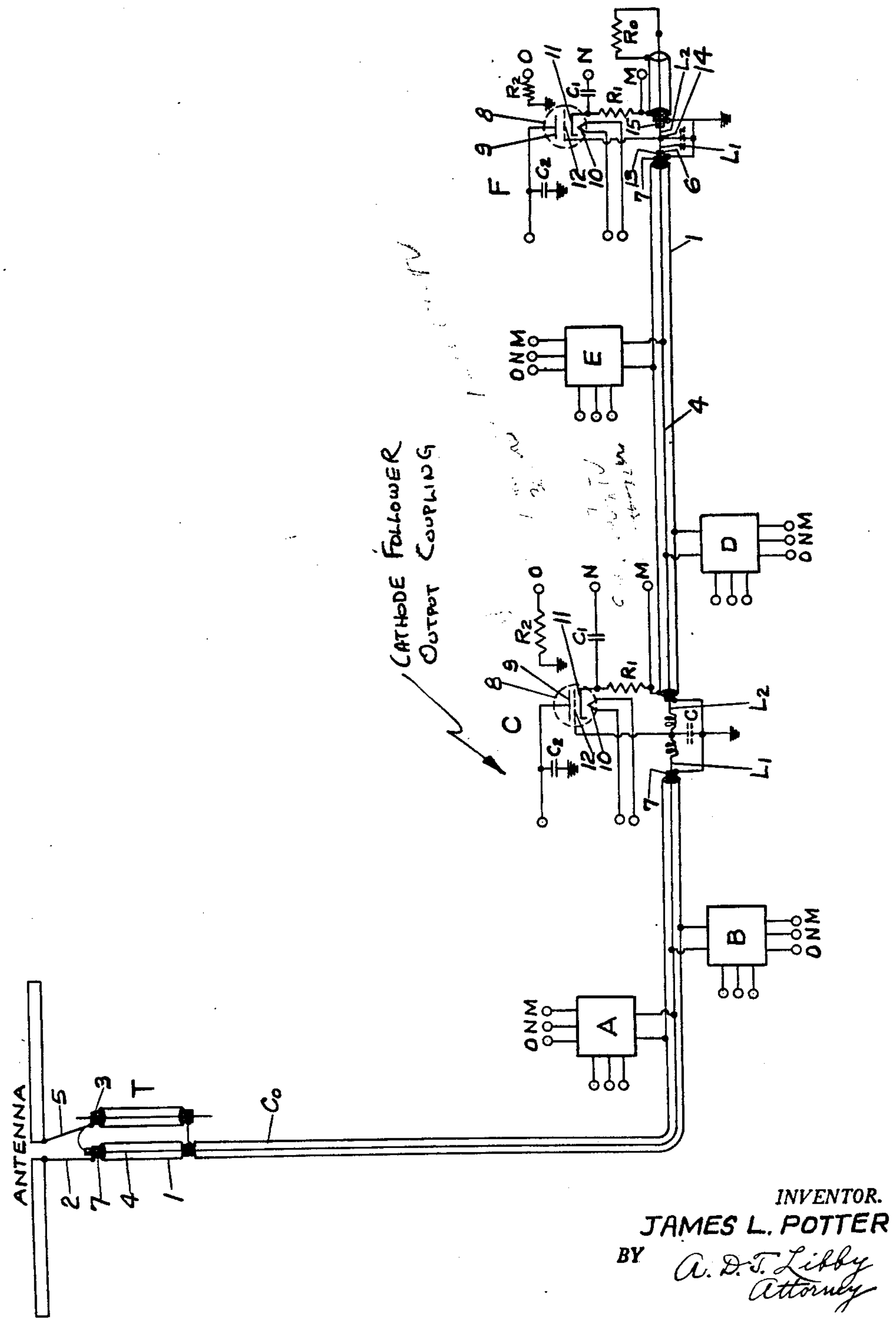
INVENTOR.
JAMES L. POTTER
BY A. D. T. Libby
Attorney

EXAMINER

Patented Dec. 18, 1951

2,578,836

UNITED STATES PATENT OFFICE 2,578,836

TELEVISION AND RADIO DISTRIBUTION SYSTEM

James L. Potter, Highland Park, N. J., assignor, by mesne assignments, to General Bronze Corporation, New York, N. Y., a corporation of New York Application December 3, 1947, Serial No. 789,394

3 Claims. (Cl. 250—9)

This invention relates to a television and radio distribution system, especially adapted for use in apartment buildings, hotels and stores where a large number of television or radio receiving sets are to be located as is highly desirable and in some cases a necessity to operate numerous television and radio sets from a single antenna, instead of installing an antenna for each set.

Various problems are encountered as the number of sets are increased and operated from the same antenna. Some of these problems are as follows:

(1) If each receiver takes a certain amount of energy from the common antenna it will limit the number of sets that can be supplied by the system. While the amount of energy taken from the line can be reduced somewhat by a resistance network, this method also reduces the strength of the signal which is needed, at least, for good television reception.

I have found that the resistance network is limited to a maximum of six present day television sets, depending on signal strength. The loss in such a system can be overcome to some extent by way of an amplifier in the feed line, but this necessitates the use of wide band amplifiers and it is therefore necessary to have an amplifier for each television channel and a channel amplifier for other radio services.

(2) If two or more receivers are connected directly to a common feed system interaction between sets will take place and cause poor signal reception. This can, to some extent be eliminated by use of resistance networks as explained in 1 above.

(3) If impedance irregularities appear on the line, such as connecting on additional receivers or improper termination of the line, reflection of signals will take place causing ghost images to appear on the screen on a television set, or causing other forms of distortion.

It is the principal object of my invention to provide a distribution system for television and radio service which will overcome the objectionable features stated as well as others, which are familiar to those skilled in this art. The system to be described requires only one antenna (although, of course, more than one may be used) attached to a single line feed depending entirely on the attenuation of the co-axial cable and the length thereof for a given number of outlets. I have found that cable lengths of from 500 to 1000 feet are feasible with outlets for 30 or more sets.

Another advantage of my system is that no master amplifier is required.

Another advantage is that if any components between the local amplifier and the television set becomes defective it is not likely to affect the entire system, but is confined only to the point where the failure occurs.

Another advantage of my system is that it provides a much less costly installation.

The system which I have developed is shown in the annexed drawing wherein the antenna is shown as of the dipole type, although the antenna could be of the vertical polarization type of a co-axial output. The antenna is connected to a co-axial cable $C_0$ which is terminated at its far end by a resistance $R_0$ that is equal to the characteristic impedance of the co-axial line, in order to prevent reflection of signals which will cause ghost images. Associated with the co-axial cable $C_0$ is a transformer T preferably of the Balun type. In this arrangement the main co-axial cable $C_0$ has its braided conductor 7 connected by the conductor 2 to oue side of the dipole antenna. The short piece of the co-axial cable T has its braided conductor 3 connected to the inner conductor 4 of the cable $C_0$ and by the conductor 5 to the other part of the antenna. The opposite end of the outer braided conductor of the short co-axial cable T is connected to the outer braided conductor of the cable $C_0$, at an odd number of one-quarter wave lengths away from the first mentioned connection between the conductor 3 and the conductor 4.

As has been mentioned the cable $C_0$ is the co-axial type having an inner conductor 4 covered by a dielectric material 6, an outer conductor 7 of braided wire and an outer coating 1. To the conductors of this co-axial cable are connected the parts included within the various outlet or junction boxes of stations A and F inclusive. At station C the parts within the outlet boxes are shown diagrammatically, and these parts control the operation of a television or radio set. These parts comprise a tube 8 which may be of the triode type such as a 6J6. This type of tube is not compulsory so long as the grid-to-plate and grid-to-cathode capacities are small and also that the tube has a resonate frequency of at least twice as great as the highest frequency that the system is to cover. It may be mentioned at this point that the frequencies contemplated are of the order of 100 kc. to 300 mc. as well as other ranges.

The plate 9 of the tube 8 is supplied with D. C. current which is approximately 150 volts with a small by-pass condenser $C_2$ of approximately .01 mf. capacity. The tube heater 10 is adapted to be supplied with A. C. voltage of 6.3 volts one side being grounded. The cathode 11 is connected through a resistor $R_1$ to ground, the resistance of which is determined by the characteristics of the tube, so that the tube may draw the desired plate current.

In the model above previously specified I have found the resistance $R_1$ to be approximately 240 ohms.

The grid 12 of the tube 8 is connected to the inner conductor by a low pass filter, and as illustrated at station C, comprises equal inductances $L_1$ and $L_2$ and capacity C.

From the preceding it will be seen that any voltage that appears on the grid of the tube will appear across the resistor $R_1$ and in magnitude about one-half of the grid voltage. Connected to the junction of the cathode 11, and the resistor $R_1$ is a low capacity condenser $C_1$ which is used to feed the RF signal to the television FM or radio set, and to prevent the antenna coil of the set from shorting $R_1$. The output of any of the outlet boxes is such that it will cater to sets having an input of 50 to 75 ohms co-axial input impedance and 300 ohms balanced impedance. The co-axial input to the television set is obtained from the terminals M and N. The 300 ohms balanced input is obtained from the terminals N and O, O being connected to ground through a resistance $R_2$ so that one line has an impedance of 150 ohms above ground.

The co-axial cable can be considered as a series of small inductances having capacity to ground. As the size these inductances decrease approaching a limit, it becomes a co-axial cable. At any point in the cable it is possible to substitute a series of inductors and condensers so that this point has the same characteristic impedance and attenuation as the original cable. It is, therefore, possible to calculate a low-pass filter which will simulate a co-axial cable and give a point from which the grid of the cathode follower can be driven. The inherent capacities of the tube and the wiring are of the order of 10 mmf. With the filter that has a cut-off frequency of 500–600 mc. and a capacity of 10 mmf., the inductance should be .028 microhenry for a value of $L_1$ plus $L_2$. This then produces a low-pass filter which has the characteristic impedance of the co-axial cable using wiring and distributed capacities for the C of the filter. Further calculations show that this co-axial cable when stripped one-half an inch from the braid to the center where the grid is tapped has an inductance of 0.014 microhenry. The grid of the tube 8 is then tapped to the centerpoint with the minimum amount of inductance possible in the lead from this point to the grid. The physical arrangement of this is shown at station F where three dots, 13, 14 and 15 along the inner conductor indicate the beginning, middle and end of the inductances $L_1$ and $L_2$ as illustrated at Station C. As illustrated at station F the outer cover 1 is stripped back to allow ground connection to be made to the outer conductor 7 which is shown as braided although it may be a tube. The power supply for the tube 8 is furnished from an independent source.

The input impedance of the cathode follower tube in each outlet box is high and has little effect on the line and the tube acts to isolate each set from the line so as to prevent interaction between sets and at the same time to prevent taking appreciable power from the line.

In television amplifiers the phase of the RF signal must be zero or multiples of 360 degrees with the incoming signal. If this is not maintained the black of the television signal will appear as white. By taking the signal from the cathode, the output signal is of the correct phase for the television set. Whereas if the signal were taken from the plate of the tube, the amplifier would have to have an even number of stages and the result would be only a small gain per stage. Consequently, the make-up of the outlet boxes as described provides a better and more economical system.

The attenuation between sets connected to the co-axial cable should be high, this is obtained by the fact that the tube 8 transmits principally in forward direction (i. e. forward direction being from conductor 4 to terminals MNO) thus preventing the signal from its set from going backward therethrough. The loss in the forward direction is about 6 db and being much greater in the reverse direction.

It may be mentioned in passing that the outlet boxes which I utilized in the system described herein are very small and compact being of the order of 4 inches long, 4 inches wide and 2¼ inches high, which are relatively low in cost and especially adapted to be installed on or within the walls of the building as any other electrical equipment.

Having thus described my invention, what I claim is:

1. In a television and radio distribution system, an antenna for feeding a co-axial cable that runs to a distribution place, junction boxes located along the cable and carrying parts electrically connected to the conductors of the cable, said parts including a cathode follower tube having at least a plate, grid, cathode and heater therefor, its grid being connected to the inner conductor of the cable by a low pass filter while its cathode is connected through a resistance to the outer conductor of the cable and to ground, the plate and heater of the tube being connected to suitable sources of current, output terminals connected across said cathode resistance, a condenser being in the output lead coming from the junction of the cathode and said resistance.

2. In a television and radio distribution system, an antenna, a distribution co-axial cable connected to the antenna through the medium of a balanced to unbalanced transformer, outlets from the cable to points of distribution, each outlet being coupled to the input of a cathode follower-type tube the cathode of which is connected to ground through a resistance, a coupling condenser, the terminals of the resistance being connected to a receiver set through said condenser.

3. A television and radio distribution system including a dipole antenna, a co-axial cable connected to the parts of the antenna through the medium of a transformer, outlets from the cable at desired points, each outlet having a tube the grid of which is connected to the inner conductor of the cable through a T-section low pass filter, a resistance connecting a cathode of the tube to ground, a coupling condenser connected to the junction of the cathode and resistance, the signal energy being taken through said condenser from the terminals of said resistance.

JAMES L. POTTER.

REFERENCES CITED

The following references are of record in the file of this patent:

UNITED STATES PATENTS

| Number | Name | Date |
|---|---|---|
| 1,853,181 | Shumard | Apr. 12, 1932 |
| 1,976,910 | Amy et al. | Oct. 16, 1934 |
| 2,000,190 | Rettenmeyer | May 7, 1935 |
| 2,003,962 | Weinberger | June 4, 1935 |
| 2,064,961 | Tidd | Dec. 22, 1936 |
| 2,094,360 | Landon | Sept. 28, 1937 |
| 2,200,055 | Burnett | May 7, 1940 |
| 2,256,084 | Goodale et al. | Sept. 16, 1941 |
| 2,330,109 | Brown | Sept. 21, 1943 |
| 2,393,971 | Busignies | Feb. 5, 1946 |
| 2,457,123 | Busignies et al. | Dec. 28, 1948 |